United States Patent
Finck

[11] 3,883,456
[45] May 13, 1975

[54] PLASTIC MASS FOR MODELLING PURPOSES AND A METHOD FOR FORMING IMPRINTS FROM THE MASS

[75] Inventor: Ludwig C. Finck, Neumarkt, Oberpfalz, Germany

[73] Assignee: Firma Eberhard Faber GmbH, Germany

[22] Filed: Dec. 29, 1972

[21] Appl. No.: 319,681

[52] U.S. Cl. 260/23 XA; 260/29.6 XA; 260/29.6 H; 260/29.6 B; 260/29.6 HT; 260/29.6 PS; 260/42.21; 260/42.57; 260/42.54
[51] Int. Cl. .................. C08f 19/14; C08f 21/04
[58] Field of Search.. 260/23 XA, 29.6 XA, 29.6 H, 260/41 R, 37 N, 29.6 PS

[56] References Cited
UNITED STATES PATENTS
2,075,543  3/1937  Reed ............................ 260/23 XA FOREIGN PATENTS OR APPLICATIONS
839,712  6/1960  United Kingdom .............. 260/37 N Primary Examiner—Melvyn I. Marquis
Assistant Examiner—William E. Parker
Attorney, Agent, or Firm—Toren, McGeady and Stanger

[57] ABSTRACT

A plastic mass suitable for modelling purposes is disclosed. The mass has the following characteristics:
a. it comprises a filler, which may be hydrophobic or hydrophilic, a hydrophilic plasticizer, and a coloring agent which is capable of dilution with water, the coloring agent being a dyestuff or a pigment;
b. it can be diluted with water;
c. in moist condition it releases and transfers color upon contact;
d. it releasably adheres to substrates.

17 Claims, 1 Drawing Figure

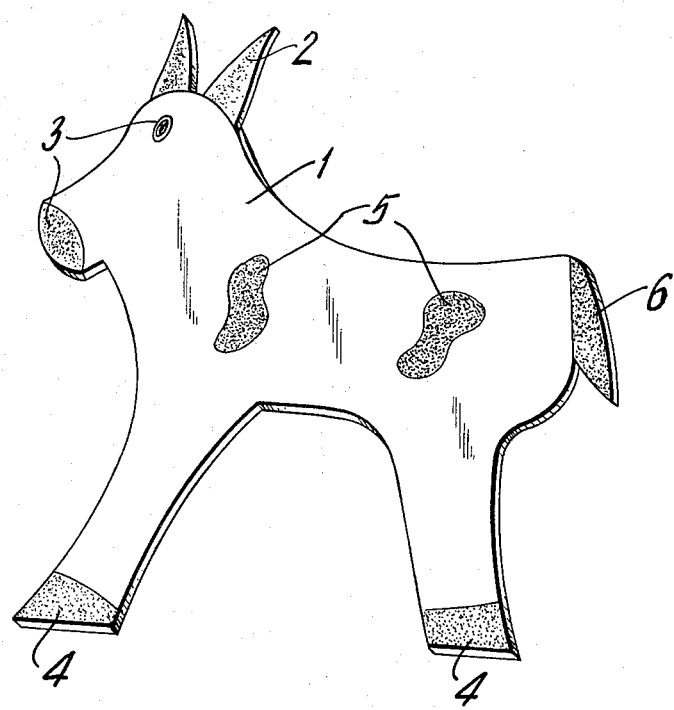

PLASTIC MASS FOR MODELLING PURPOSES AND A METHOD FOR FORMING IMPRINTS FROM THE MASS

The invention is also concerned with a kit comprising a plurality of pieces of the plastic mass, each of the pieces having a different color.

Considered from a different aspect, the invention discloses a method of forming a multi-colored imprint of a multi-colored object, wherein portions of the object are formed by kneading pieces of the plastic mass into desired shapes, at least two of the pieces having different colors, whereafter the shapes are assembled into the desired object by sticking the pieces together so that one surface of the object is substantially planar. Upon moistening the planar surface and pressing a color-receptive receiving sheet against the surface, a multi-colored imprint is formed on the receiving sheet.

FIELD OF INVENTION

The invention is concerned with plastic masses for modelling purposes. The plastic modelling mass of the invention is suitable for playing, educational and artistic purposes.

SUMMARY OF THE INVENTION

The invention is concerned with a plastic modelling mass which may advantageously be used for playing, educational and artistic purposes.

According to the invention, the plastic mass comprises a hydrophobic or hydrophilic filler, a hydrophilic plasticizer and a coloring agent which is capable of dilution with water. The coloring agent may be a pigment or a dyestuff.

Contrary to prior art modelling masses which exclusively serve the purpose of forming shapes of varying kinds, the inventive modelling mass makes it possible to produce multi-colored imprints from objects or shapes composed of the mass, thereby considerably enlarging the field of utility and usefulness of such masses for play, educational and artistic purposes.

Accordingly, it is a primary object of the invention to create a plastic mass, suitable for modelling purposes, which is colored and which in moist condition releases and transfers color upon contact, so that a colored image can readily be formed from shapes composed of the mass.

Generally it is an object of the invention to improve on the art of plastic modelling masses as presently practiced.

Due to the color releasing and transferring characteristics of the inventive plastic mass, an entirely new field of utilization is opened up for such masses since the person using the mass, such as a playing child, a student, a teacher or an artist, in addition to being able of forming shapes or objects of any kind, may make use of the color and coloring characteristics of the mass and may thus form multi-colored objects and shapes and produce colored imprints therefrom.

In accordance with the invention, the plastic mass contains a hydrophilic plasticizer - which may be water-soluble, -, a hydrophobic or hydrophilic filler and a coloring agent which is capable of dilution with water, the entire mass being capable of being diluted with water. Due to the composition of the mass, the mass, in moist condition releases and transfers color upon contact and the mass may be releasably adhered to a substrate of any suitable nature.

The plasticizer is hydrophilic and may, for example, be anyone, or a mixture, of the following substances:
polyethylene glycol, alkali metal or alkaline earth metal salts of fatty acids, dextrin, glycerin and methylcellulose.

Thus, the plasticizer may, for example, be one of the following:
sodium stearate, potassium soap, calcium oleate or sodium oleate.

While the plasticizer should be hydrophilic, it need not necessarily be water-soluble; some of the enumerated plasticizers are, however, water-soluble. In a preferred embodiment of the invention, the hydrophilic plasticizer is a liquid which is present in an amount sufficient to render the mass plastic and kneadable without the addition of water. The respective amount of plasticizer for this purpose will, of course, vary in dependence on the nature and quantity of the other ingredients of the mass.

In respect of the filler, it has previously been stated that both hydrophobic and hydrophilic fillers may be used. The following are examples of suitable fillers for the purposes of the present invention:
polyvinylchloride, chalk, talcum, bentonite, barium sulfate, alumina and kaolin. Of these fillers, polyvinylchloride is hydrophobic, while the others are hydrophilic.

In respect of the coloring agent, experiments have indicated that hydrophilic dispersed pigments give excellent results.

The pigment may thus, for example, be:
a mono- or diazo pigment of the naphthol series or the sodium or calcium salt thereof, or it may be a copper phthalo cyanine.

If the coloring agent is a dyestuff, aniline dyestuffs are particularly suitable for the inventive purposes.

If a pigment is used, it is preferably premixed with a dispersing agent, the dispersing agent being of non-ionogenic nature. It has been ascertained that satisfactory results are obtained if the pigment is premixed with a dispersing agent in the nature of an alkyl- and/or alkylarylpolyglycolether, the amount of dispersing agent being about 0.5–2 percent by weight calculated on the pigment quantity.

In many instances it is also advantageous if the mass contains an emulsifier which includes a hydrophilic group. Many emulsifiers contain hydrophilic and hydrophobic terminal groups. If the mass is to be diluted with water, the hydrophilic terminal groups then facilitate the water dilution of the mass. A large number of emulsifiers are suitable for the inventive purposes. Examples are fatty acid amides, poly saccharides, Turkey-red oil, mono fatty acid esters and alkyl-polyglycol ethers.

The best results, particularly in respect of plasticity, are obtained if the weight ratio of filler to plasticizer is between about 2.5:1 and 7:1.

According to a further modification of the invention, it has been ascertained that in many instances it is advantageous if the mass also contains a binder in the form of an aqueous suspension of synthetic resin particles which are capable of cross-linking upon application of heat. This aqueous suspension may constitute between 0.01 to 0.1 percent by weight of the total mass, said aqueous suspension containing water, 15–80 percent by weight of synthetic resin and 0.2–5.0 percent by weight of an organic solvent. If the mass is adhered to a substratum of textile nature, the binder, upon heating of the mass, forms a cross-linked substance which binds the particles of the pigment to each other and the substrate and renders the pigment particles water-insoluble.

As previously stated, the inventive plastic mass may be used in conventional manner be used for shaping and forming purposes so as to shape figures or objects of any kind. However, contrary to the prior art masses, and due to the nature of the color containing component of the mass, the mass and the object formed therefrom may be used for the release of color in moist condition.

Tests have indicated that the plasticity of the mass is retained for indefinite periods of time so that the life of the mass is unlimited from a practical point of view. The plasticity of the mass is not negatively affected by repeated reuse.

In order to utilize the color aspects of the inventive mass and the possibility of forming multi-colored imprints from objects shaped by the mass, it is recommended that the following procedure be followed:

Pieces of mass of different color are stuck together into the desired shape so that at least one surface of the shape is substantially planar. If desired, the intended shape or figure may first be formed from pieces of the mass of different color without considering the planeness of the figure, whereupon a plane surface is created by patting or rolling. In this manner multi-colored objects or figures with a plane surface are created.

Since the various pieces of the mass of course easily stick to each other, the formation of the object from pieces of different color does not create any difficulty. A piece of paper or a color-receptive sheet of another material may then be pressed against the surface whereupon the colored image is formed on the receiving surface. Upon removal of the sheet, the imprint remains on the sheet, the imprint being colored corresponding to the coloring of the plane surface of the object. In this manner any number of colored imprints can be made from the object. In order to make sure that proper color transfer takes place, the surface of the object from which the color is to be transferred should, of course, have certain moisture. If the inherent moisture of the colored surface is not sufficient, e.g. if the mass does not contain water, the surface should be moistened, for example, by water before the imprints are made. In the alternative, of course, the receiving sheet may be moistened.

The shelf life of objects formed from the inventive plastic mass is substantially unlimited.

The mass may be used in the manner of a paint or coloring medium by a playing child, or mass fragments may be removed from a piece of mass of a given color, for example, by a painting brush or even with the fingers and be reapplied to a piece of mass of a different color or to a receiving sheet. In this manner any number of color effects can be obtained. The inventive plastic mass thus is eminently suitable as a creative plaything and also for artists and for educational purposes.

It will be appreciated that from a practical point of view it is advantageous to supply kits or modelling sets in which pieces of plastic mass of different colors are provided in suitable receptacles or boxes.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

The single FIGURE of the drawings is a somewhat diagrammatical perspective view of a horse-like figure formed from the inventive plastic mass.

Referring to the figure, it will be noted that the horse-like representation shown therein is composed of several pieces of plastic mass 1 through 6, each of the pieces having a different color. Thus, while the eye and nose pieces 3 may, for example, be black, the piece forming the body portion 1 may be brown while the pieces forming the spots 5 may be white. The ear pieces 2, in turn, may be of a different color while the piece 6 forming the tail and the horseshoe pieces 4 may again be of a different color. It will be noted that the top surface of the figure is substantially planar which may be accomplished by first sticking the various pieces 1 through 6 together and then rolling or patting the figure thus obtained. By pressing a piece of paper or the like against the planar surface while the surface is sufficiently moist, a multi-colored imprint or image of the figure is formed on the paper. It will also be appreciated that the mass may be reused and that the various pieces may be disassembled and returned to the kit. The inventive mass adheres well to substrates of various nature such as wood plates, metal and the like.

In one embodiment the filler is hydrophobic and consists of polyvinylchloride while the hydrophilic plasticizer is liquid polyethylene glycol, the amount of plasticizer being sufficient to render the mass kneadable without the addition of water.

It has previously been mentioned that sodium oleate is a suitable plasticizer. In this context it is noted that sodium oleate and also some of the other plasticizers may fulfil a double function since they also act as fillers in the total mass.

As previously stated, the inventive mass may contain an emulsifier of the indicated kind. The addition of such emulsifiers is preferred since it increases the capability of water-dilution of the mass. This is caused by the hydrophilic groups of the emulsifier. Alkylpolyglycolether is a particularly preferred emulsifier for the inventive purposes.

As stated, the coloring agent may be in the form of hydrophilic pigments which are incorporated into the mass after having been dispersed with a dispersing agent, the dispersing agent being of non-ionogenic nature. It will be appreciated that the same mass may contain pigments of different color in order to obtain desired color hues. Dyestuffs, such as aniline dyes, may, however be used instead.

In respect of the previously mentioned binder in the form of an aqueous suspension of synthetic resin particles, it should be noted that the resin particles should be capable of cross-linking upon application of heat. In this manner, when a layer of the mass is adhered to a textile substrate, the binder, upon heating of the layer, forms a cross-linked substance which binds the particles of the pigment to each other and to the textile substrate, rendering the pigment particles water-insoluble. In order to heat the layer or colored image, it is usually sufficient to insert the substrate-layer structure into a baking oven or to iron a layer-textile substrate laminate.

It is also within the scope of the invention to incorporate a bactericidal agent into the mass.

The invention will now be described by several Examples, it being understood that these Examples are given by way of illustration and not by way of limitations and that many changes may be effected without affecting in any way the scope and spirit of the invention as recited in the appended claims.

EXAMPLE 1

A plastic mass was formed by mixing together the following ingredients, in parts by weight:

| | |
|---|---|
| Dextrin | 60–100 |
| Glycerin (liquid plasticizer) | 20– 60 |
| Sodium oleate | 5– 20 |
| Kaolin | 20–100 |
| Pigment (premixed with dispersing agent) | 5– 10 |
| Synthetic resin | 0.5–2.0 |

EXAMPLE 2

A plastic mass was formed by mixing together the following ingredients, in parts by weight:

| | |
|---|---|
| Chalk | 100 – 200 |
| Blanc fixe | 30 – 50 |
| Potassium soap | 10 – 30 |
| Glycerin | 10 – 45 |
| Pigment (premixed with dispersing agent) | 10 – 20 |
| Binder | 0.4 – 2.0 |

EXAMPLE 3

A plastic mass was formed by mixing together the following ingredients, in parts by weight:

| | |
|---|---|
| Polyvinyl chloride powder | 30 – 50 |
| Kaolin | 80 – 120 |
| Polyglycolether(liq. plasticizer) | 60 – 90 |
| Pigment (premixed with dispersing agent) | 7 – 15 |
| Binder | 0.3 – 1.0 |

EXAMPLE 4

A plastic mass was formed by mixing together the following ingredients, in parts by weight:

| | |
|---|---|
| Polyvinyl chloride powder | 15 – 50 |
| Metal soap | 2.5 – 10 |
| Kaolin | 20 – 60 |
| Polyglycolether | 15 – 25 |
| Emulsifier | 7.5 – 2.5 |
| Binder | 0.15 – 2.0 |
| Pigment (premixed with dispersing agent) | 1.5 – 2.5 |

EXAMPLE 5

A plastic mass was formed by mixing together the following ingredients, in parts by weight:

| | |
|---|---|
| Polyvinylchloride powder | 3.0 |
| Sodium oleate | 0.24 |
| Kaolin | 4.0 |
| Polyethylene glycol | 2.0 |
| Emulsifier | 1.0 |
| Binder | 0.015 |
| Pigment-blue | 0.3 |

What is claimed is:

1. A kneadable coherent mass suitable for modelling purposes, said mass having the following characteristics:
   a. it comprises a hydrophobic or hydrophilic filler, a hydrophilic plasticizer, and a coloring agent which is capable of dilution with water;
   b. it can be diluted with water;
   c. in moist condition it releases and transfers color upon contact;
   d. it releasably adheres to substrates.

2. A kneadable coherent mass as claimed in claim 1, wherein said filler is selected from the group consisting of polyvinylchloride, chalk, talcum, bentonite, barium sulfate, alumina and kaolin while said hydrophilic plasticizer is selected from the group consisting of polyethylene glycol, alkali metal salts of fatty acids, alkaline earth metal salts of fatty acids, dextrin, glycerin and methylcellulose.

3. A kneadable coherent mass as claimed in claim 2, wherein said hydrophilic plasticizer is sodium stearate, potassium soap, calcium oleate or sodium oleate.

4. A kneadable coherent mass as claimed in claim 1, wherein the coloring agent is a hydrophilic, dispersed pigment or a dyestuff.

5. A kneadable coherent mass as claimed in claim 4, wherein the pigment is a mono- or diazo pigment of the naphthol series or the sodium or calcium salt thereof, or is a copper phthalo cyanine, while said dyestuff is an aniline dye.

6. A kneadable coherent mass as claimed in claim 4, wherein the mass additionally contains a dispersing agent for the pigment, said dispersing agent being nonionogenic.

7. A kneadable coherent mass as claimed in claim 6, wherein the dispersing agent is an alkyl- and/or alkylarylpolyglycolether, the amount of dispersing agent being about 0.5–2 percent by weight calculated on the pigment quantity.

8. A kneadable coherent mass as claimed in claim 1, wherein the mass also comprises an emulsifier containing a hydrophilic group.

9. A kneadable coherent mass as claimed in claim 8, wherein the emulsifier is selected from the group consisting of fatty acid amides, poly saccarides, Turkey-red oil, mono fatty acid esters and alkylpolyglycol ethers.

10. A kneadable coherent mass as claimed in claim 9, wherein the weight ratio of filler to plasticizer is between about 2.5:1 and 7:1.

11. A kneadable coherent mass as claimed in claim 1, further comprising a binder in the form of an aqueous suspension of synthetic resin particles which are capable of cross-linking upon application of heat.

12. A kneadable coherent mass as claimed in claim 11, wherein the aqueous suspension comprises between 0.01 to 0.1 percent by weight of the total mass, said aqueous suspension containing water, 15–80 percent by weight of synthetic resin and 0.2–5.0 percent by weight of an organic solvent.

13. A kneadable coherent mass as claimed in claim 1, which has one of the following five compositions, in parts by weight:

| | | |
|---|---|---|
| (1) | Dextrin | 60 – 100 |
| | Glycerin | 20 – 60 |
| | Sodium oleate | 5 – 20 |
| | Kaolin | 20 – 100 |

-Continued

| | | |
|---|---|---|
| | Pigment (premixed with dispersing agent) | 5 – 10 |
| | Synthetic resin | 0.5 – 2.0 |
| (2) | Chalk | 100 – 200 |
| | Blanc fixe | 30 – 50 |
| | Potassium soap | 10 – 30 |
| | Glycerin | 10 – 45 |
| | Pigment (premixed with dispersing agent) | 10 – 20 |
| | Binder | 0.4 – 2.0 |
| (3) | Polyvinyl chloride powder | 30 – 50 |
| | Kaolin | 80 – 120 |
| | Polyglycolether | 60 – 90 |
| | Pigment (premixed with dispersing agent) | 7 – 15 |
| | Binder | 0.3 – 1.0 |
| (4) | Polyvinyl chloride powder | 15 – 50 |
| | Metal soap | 2.5 – 10 |
| | Kaolin | 20 – 60 |
| | Polyglycolether | 15 – 25 |
| | Emulsifier | 7.5 – 2.5 |
| | Binder | 0.15 – 2.0 |
| | Pigment (premixed with dispersing agent) | 1.5 – 2.5 |
| (5) | Polyvinylchloride powder | 3.0 |
| | Sodium oleate | 0.24 |
| | Kaolin | 4.0 |
| | Polyethylene glycol | 2.0 |
| | Emulsifier | 1.0 |
| | Binder | 0.015 |
| | Pigment-blue | 0.3. |

14. A plastic mass as claimed in claim 11, in combination with a textile substrate to which said mass is adhered, said binder, upon heating of said mass, forming a cross-linked substance which binds the particles of the pigment to each other and said substrate and renders said pigment particles water-insoluble.

15. A kit comprising a receptacle and a plurality of pieces of the plastic mass of claim 1, each of said pieces having a different color.

16. A method of forming a multi-colored imprint of a multi-colored object which comprises forming portions of said object by kneading pieces of the plastic mass of claim 1 into desired shapes, at least two of said pieces having different colors, assembling the shapes into the desired object by sticking the pieces together so that one surface of the object is substantially planar, moistening the planar surface and pressing a color-receptive receiving sheet thereon, and removing the sheet.

17. A kneadable coherent mass as claimed in claim 1, wherein said hydrophilic plasticizer is a liquid which is present in an amount sufficient to render the mass plastic and kneadable without the addition of water.

* * * * *